No. 638,483. Patented Dec. 5, 1899.
W. W. SWETT.
ACETYLENE GAS GENERATOR.
(Application filed Mar. 25, 1896.)
(No Model.) 2 Sheets—Sheet 1.

Witnesses.
Harry Kilgore
R. D. Merchant

Inventor:
Wilbur W. Swett.
By his Attorney,
Jas. F. Williamson

No. 638,483. Patented Dec. 5, 1899.
W. W. SWETT.
ACETYLENE GAS GENERATOR.
(Application filed Mar. 25, 1896.)
(No Model.) 2 Sheets—Sheet 2.
Fig. 3.
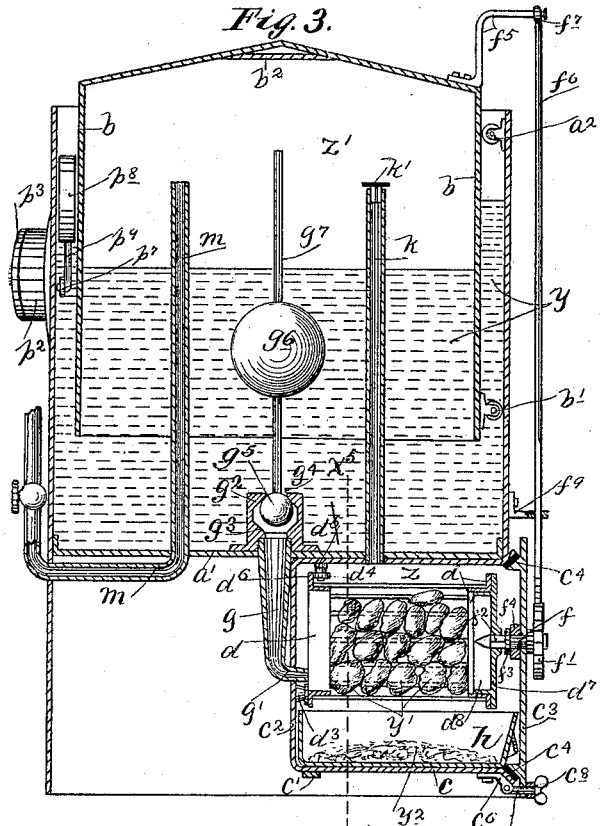
Fig. 4.
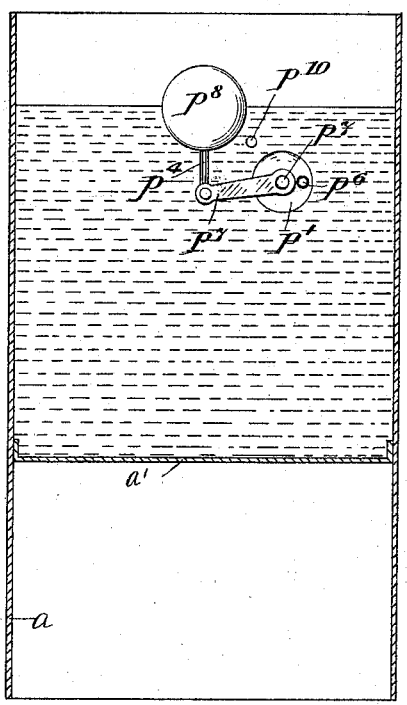
Fig. 5.
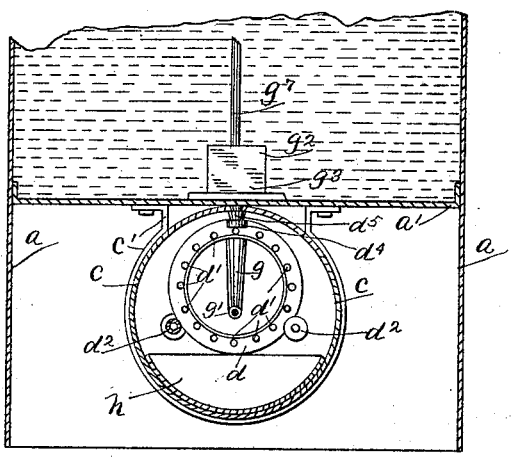
Fig. 6.
Fig. 7.
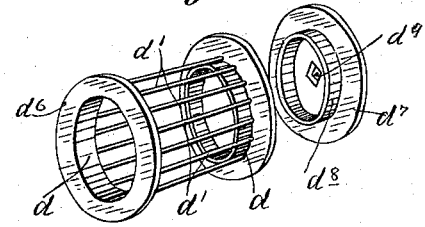
Witnesses:
Harry K. Algste
R. D. Merchant
Inventor:
Wilbra W. Swett.
By his Attorney,
Jas. F. Williamson

UNITED STATES PATENT OFFICE.

WILBRA W. SWETT, OF MINNEAPOLIS, MINNESOTA, ASSIGNOR TO THE ACETYLENE HOUSE LIGHTING COMPANY, OF WEST VIRGINIA.

ACETYLENE-GAS GENERATOR.

SPECIFICATION forming part of Letters Patent No. 638,483, dated December 5, 1899.

Application filed March 25, 1896. Serial No. 584,814. (No model.)

*To all whom it may concern:*

Be it known that I, WILBRA W. SWETT, a citizen of the United States, residing at Minneapolis, in the county of Hennepin and State of Minnesota, have invented certain new and useful Improvements in Acetylene-Gas Generators and Holders; and I do hereby declare the following to be a full, clear, and exact description of the invention, such as will enable others skilled in the art to which it appertains to make and use the same.

My invention has for its object to provide an improved acetylene-gas generator and holder.

To this end my invention comprises the novel devices and combinations of devices hereinafter described and defined in the claims.

The preferred form of my invention is illustrated in the accompanying drawings, wherein like letters refer to like parts throughout the several views.

Figure 1:
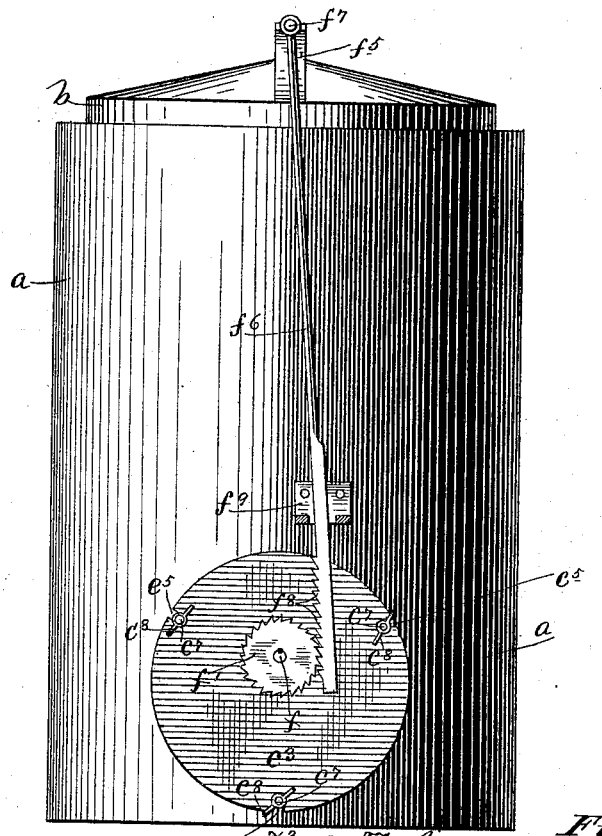
Figure 2:
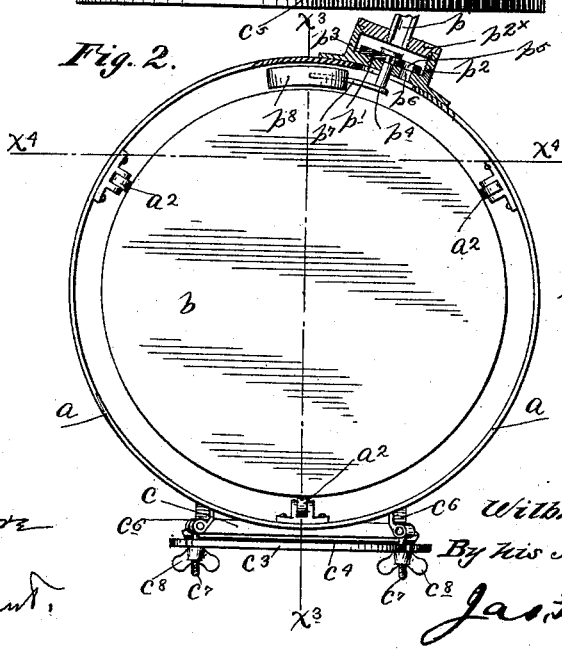
Figure 8:
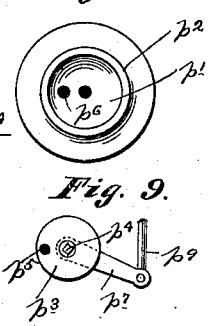
Figure 9:
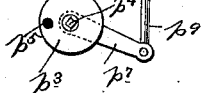

Figure 1 is a front elevation of my improved apparatus. Fig. 2 is a plan view of the same, some parts being shown in section. Fig. 3 is a central vertical section taken through the apparatus on the line $X^3 X^3$ of Fig. 2. Fig. 4 is a vertical section taken through a portion of the apparatus substantially on the line $X^4 X^4$ of Fig. 2. Fig. 5 is a vertical section taken through a portion of the apparatus substantially on the line $X^5 X^5$ of Fig. 3. Fig. 6 is a view in perspective showing a cylindrical cage-like carbid-holder removed from the generating-chamber, with the removable head of said cage-like carbid-holder withdrawn therefrom. Fig. 7 is a perspective view showing one of the flanged wheels or antifriction-sheaves used in connection with the rotary carbid-holder. Fig. 8 is a detail in elevation, looking from the outside of the apparatus, showing a face-plate valve-seat; and Fig. 9 is a detail in elevation, also looking from the outside of the apparatus, showing a face-valve which coöperates with the valve-seat shown in Fig. 8.

$a$ indicates a cylindrical tank having an open upper end and provided with a bottom plate $a'$, located a considerable distance above its lower extremity.

$b$ indicates a cylindrical tank-section having an open lower and a closed upper end and working telescopically in the interior of the tank-section $a$, with its sides spaced some little distance from the walls of said tank-section $a$. Frictional engagement between the tank-sections $a$ and $b$ is prevented by means of antifriction-roller devices $a^2$ and $b'$, mounted, respectively, on said tank-sections $a$ and $b$ and engaging, respectively, with said tank-sections $b$ and $a$.

As shown, the tank-section $b$ is provided on its closed upper end with a horizontally-arranged striking surface or disk secured thereto below the apex of said closed end.

As shown, the generating compartment or chamber is formed by a cylindrical body $c$, which is secured in a horizontal position immediately under the bottom plate $a'$ of the tank-section $a$ by means of yoke-pieces $c'$, embracing said cylinder and having their ends riveted or otherwise secured to said bottom plate $a'$. The cylinder $c$ is closed at its inner end by means of the fixed head $c^2$ and at its outer end by means of a removable head $c^3$.

An air-tight joint is formed between the open end of the cylinder $c$ and head $c^3$ by means of a packing ring or gasket $c^4$ clamped between said parts. The removable head $c^3$ is provided with peripheral notches $c^5$, and the cylinder $c$ is provided with correspondingly-located hinge-lugs $c^6$.

$c^7$ indicate draw-bolts which are pivoted or hinged at their rear ends to the hinge-lugs $c^6$ and are provided at their outer free ends with screw-threads on which work nuts $c^8$. The free ends of these draw-bolts are adapted to be engaged with or disengaged from the notches $c^5$ of the head $c^3$ by lateral pivotal movement. When the draw-bolts $c^7$ are engaged with or turned into the notches $c^5$, the removable head $c^3$ may be tightly clamped into place by tightening the nuts $c^8$ on the draw-bolts $c^7$.

By the above-described arrangement two chambers or compartments are formed—to wit, the generating-chamber $z$, formed in the interior of the cylinder $c$, and the combined water and storage chamber $z'$, formed in the interiors of the tank-sections $a$ and $b$.

In the preferred arrangement of my apparatus I equip the generating-chamber $z$ with a rotary carbid-holder. As shown, this rotary carbid-holder comprises a pair of flanged rings $d$, spaced apart and connected or tied together by a series of cylindrically-arranged rods $d'$. The cylindrical cage thus formed is left open at its rear or inner end, and the cage or holder is supported in position, with freedom for rotary motion, by means of a pair of grooved or flanged antifriction-sheaves $d^2$, supported on studs $d^3$, projecting inward from the fixed cylinder-head $c^2$, and by an antifriction-roller $d^4$, mounted on a stud $d^5$, depending from the upper portion of the cylinder $c$. As shown, there are two of the flanged sheaves $d^2$, and the flanges of the same embrace and support the under portion of the peripheral flange $d^6$ of the rear ring $d$, while there is but one roller $d^4$, and this engages the outer face of said flange $d^6$ at the upper portion of the same and serves to prevent the forward end of the cylindrical cage from dropping down when not otherwise supported.

When in working position, the forward end of the cylindrical cage or carbid-holder $d\ d'$ is closed by means of a removable cap or end piece $d^7$, which has a flange $d^8$, engageable with the interior of the forward or outer ring $d$ with sufficient friction to cause said parts to turn together. The removable head $d^7$ is provided at its center with a square perforation $d^9$.

The carbid-holder just described is given rotary motion automatically by means of a device which, as shown, comprises the following details: $f$ indicates a short and loose shaft mounted in the removable cylinder-head $c^3$ and provided at its outer end with a fixed ratchet-wheel $f'$ and terminating at its inner end in a square end or shank portion $f^2$, adapted when in working position to engage through the square perforation $d^9$ of the holder-cap $d^7$. It will be noted that the point of the shank portion $f^2$ is made conical, so as to guide said shank portion into its seat when the cylinder-head $c^3$ is placed in position. The shaft $f$ is also provided forward of the shank $f^2$, but inward of the cylinder-head $c^3$, with a collar $f^3$.

$f^4$ indicates a packing-ring which surrounds the shaft $f$ between the cylinder-head $c^3$ and the collar $f^3$. Under the gas-pressure contained in the generating-compartment $z$ when the apparatus is in operation this packing-ring $f^4$ will form an air-tight joint between the shaft $f$, the collar $f^3$, and cylinder-head $c^3$ and will thereby hold said shaft $f$ and ratchet-wheel $f'$ under a slight friction with respect to said cylinder-head $c^3$.

$f^5$ indicates a bracket or support carried by the movable tank-section $b$. $f^6$ indicates a ratchet-rod pivoted at its upper end, as shown at $f^7$, to the end of the bracket $f^5$ and provided at its free lower end with ratchet-teeth $f^8$, adapted for engagement with the teeth of the ratchet-wheel $f'$, carried by the shaft $f$. The lower end of this ratchet-rod $f^6$ is permitted lateral swinging motion toward and from the ratchet-wheel $f'$ by means of a slotted bracket $f^9$, secured to the front of the tank-section $a$.

It will be noted that the arrangement of the ratchet-teeth $f^8$ on the rod $f^6$ and the teeth on the ratchet-wheel $f'$ are such that said ratchet-teeth $f^8$ will turn the wheel $f'$ on the upstroke, but will slip over the teeth of said wheel $f'$ on the downstroke. It will also be noted that the pivot $f^7$ of the rod $f^6$ is so located that the free end of said roll will be swung by gravity toward the ratchet-wheel $f'$, so that the ratchet-teeth $f^8$ will tend to engage the teeth of said wheel.

The compartments $z$ and $z'$ are in communication with each other through a valved passage which, as shown, is formed in a vertical pipe-section $g$, terminating at its lower end in a laterally-turned and contracted nozzle-section $g'$ and terminating at its upper end in a double valve-seat $g^2\ g^3$. The upper valve-seat section $g^2$ is provided with a central perforation $g^4$ of substantially the same size as the largest dimension of the pipe-section $g$. This perforation $g^4$ is, as will be noted, located below the liquid-level of the compartment $z'$, while the nozzle-section $g'$ opens into the generating-chamber $z$ and stands in position to discharge the water from the compartment $z$ onto the carbid bodies contained in the holder $d\ d'$.

$g^5$ indicates a ball-valve which works between and is adapted for engagement with either of the valve-seat sections $g^2$ or $g^3$ and is of such dimensions that when in an intermediate position it will open the passage between itself and said valve-seat sections, but will close said passage when moved into engagement with either of said sections $g^2$ or $g^3$. The ball-valve $g^5$ is normally held upward into engagement with the valve-seat section $g^2$ by means of an air-bulb or float $g^6$, having a stem $g^7$, the lower end of which is attached to said valve $g^5$ and the upper end of which projects upward and is adapted to be engaged by the striking surface or disk $b^2$, carried by the movable tank-section $b$. $h$ indicates a scoop or catch-basin which is removably placed in the bottom of the cylinder $c$, immediately below the rotary carbid-holder $d\ d'$, and adapted to catch the precipitation of lime products from said carbid-holder.

$y$ indicates water contained in the tank-sections $a$ and $b$.

$y'$ indicates carbid bodies contained in the rotary cage-like carbid-holder $d\ d'$, and $y^2$ indicates the lime products caught by the removable scoop or basin $h$.

The compartments $z$ and $z'$ are also in communication with each other through a gas-conveying pipe $k$, which taps the upper portion of said generating-compartment $z$ and terminates within the storage-compartment $z'$ at a point above the liquid-level of the same. The upper end of this pipe $k$ is provided with a check-valve $k'$, adapted to permit the flow of gas from the generating-compartment $z$ to the storage-compartment $z'$, but to prevent the flow of the gas from said compartment $z'$ into said compartment $z$.

$m$ indicates a valved conveying or draw-off pipe, which also opens into the storage chamber or compartment $z'$ from a point above the liquid-level of the same and extends outward through the bottom of the fixed tank-section $a$ and leads to some desired point or points where it is to be consumed.

It will be understood, of course, that the burners, located at the distant points of consumption and in connection with the pipe $m$, will control the escape of the gas from the storage-chamber $z'$.

Water is supplied to the tank-section $a$ through a supply-pipe $p$, leading from some suitable source of water-supply under pressure. The flow of water into said tank-section $a$ is automatically controlled, so as to keep the liquid-level of the same practically constant, by means of the following automatic valve mechanism:

$p'$ indicates a face-plate valve-seat formed on the interior of a valve-box $p^2$, secured to the exterior of the tank-section $a$. The outer end of this valve-box $p^2$ is closed by means of a removable cap $p^{2\times}$, into which the supply-pipe $p$ is tapped for communication with the interior of said valve-box $p^2$.

$p^3$ indicates a face-valve, which works pivotally against the face-plate valve-seat $p'$ and is rigidly secured to the outer end of a short shaft $p^4$, the inner end of which projects through said valve-seat and terminates between the walls of the tank-sections $a$ and $b$. The valve $p^3$ is provided with a passage $p^5$, which is located eccentric to its pivot and is adapted to coincide with a passage $p^6$ in said valve-seat $p'$ in one position of said valve. It will be noted that the tank-section $a$ is cut away, as shown at $a^3$, so as to give an opening of sufficient size to include the passage $p^6$ and the seat for the stem $p^4$, formed in the valve-seat $p'$.

$p^7$ indicates an arm which is secured on the inner end of the valve-shaft $p^4$ between the walls of the tank-sections $a$ and $b$.

$p^8$ indicates an air-bulb or float having a stem $p^9$, the lower end of which is pivotally secured to the free end of the arm $p^7$.

$p^{10}$ indicates a stop projected inward from the side of the tank-section $a$ and adapted to limit the upward pivotal movement of the arm $p^7$.

The weight of the float $p^8$ and arm $p^7$ is sufficient when the level of the water $y$ in the annular compartment formed between the tank-sections $a$ and $b$ is lowered to turn the valve $p^3$, so that its passage $p^5$ will be brought into registration with the passage $p^6$ in the valve-seat $p'$. This will of course permit the inflow of water from the supply-pipe $p$, which will continue until the altitude of the water in the annular compartment is again raised to its normal height. The water being thus raised around the air-bulb $p^8$ will cause the same to rise, and thereby cause the valve $p^2$ to be turned into its closed position, so as to shut off the inflow of water from the supply-pipe $p$. It will thus be seen that by means of the valve device just described the altitude of the column of water in the tank-section $a$ will be automatically maintained at practically a constant height. This is important inasmuch as evaporation and the chemical action in the generation of the gas would otherwise cause the altitude of the column to constantly vary.

The automatic operation of the apparatus in the act of generating gas is substantially as follows: Before the generating action is begun water must be placed in the tank $a$ and carbid bodies must be placed in the carbid-holder $d$ $d'$, as shown in the accompanying drawings. As already indicated, the carbid bodies may be placed in the carbid-holder $d$ $d'$ by removing the cylinder-head $c^3$ and the cage-cap $f^2$. Before the generation of gas has begun the movable tank-section $b$ will be in its lowermost position, in which position the striking-surface $b^2$ will engage the upper end of the air-bulb stem $g^7$, thereby holding the ball-valve $g^5$ downward tightly against the valve-seat section $g^3$, thus closing the communicating passage $g$. The generation of gas may be started by introducing an initial charge of water onto the carbid bodies $y'$ in the generating-chamber $z$. This may be readily done with a small apparatus simply by raising the movable tank-section $b$ sufficiently to permit the valve $g^5$ to be unseated from the valve-seat section $g^3$ under the action of the float $g^6$. In case the apparatus is made very large, so that it is not convenient to thus raise the tank-section $b$ to cause the initial generation of gas, various means (not shown) might be devised for causing this initial charge of water into the generating-chamber. After the generation of gas has once been started the movable tank-section $b$ will be held upward with its striking-surface $b^2$ above the upper end of the air-bulb stem $g^7$ by the pressure of the generated gas therein contained, and the valve $g^5$ will be held against the valve-seat section $g^2$ by the action of the air-bulb $g^6$. In this position of the valve $g^5$ the passage $g^2$ will be closed and the supply of water to the generating-chamber $z$ will be shut off, thereby stopping the generation of gas. When, however, the volume of gas has been reduced below a predetermined amount, the tank-section $b$ will be permitted to lower until the striking-surface $b^2$, carried thereby, will be again engaged with the upper end of the air-bulb stem $g^7$, and thereby forces the valve $g^5$ downward out of engagement with the valve-seat section $g^2$. The lowering of the tank $b$ will be very gradual, and hence water will be permitted to flow through the passage $g$ onto the carbid contained in the holder $d$ $d'$, thereby causing the generation of gas which, flowing through the pipe $k$ into the section $b$, will again raise the said section $b$.

It will thus be seen that the generation of the gas will be automatically controlled and that this generation will take place only during times when the gas stored in the chamber $z'$ is being consumed.

It will be noted that the nozzle end $g'$ of the pipe-section $g$ is contracted and turned laterally, so as to discharge a stream of water against the particles of carbid $y'$ which are nearest to the inner end of the cylindrical carbid-holder $d\ d'$.

As is obvious from the foregoing description, every time that the movable tank-section $b$ makes an upstroke the carbid-holder $d\ d'$ will be given one step of rotary motion, and under the continued reciprocations of said tank-section $b$ said carbid-holder will be moved step by step in the constant direction of rotation. This rotary action of the carbid-holder is a very important feature and greatly increases the efficiency of the apparatus. Under the rotary motion of the carbid-holder the lime products which have been formed within the same will be constantly rattled or shaken, and thereby caused to fall from said holder. By this action the lime products are effectually prevented from clogging in the carbid-holder, and hence fresh or uneaten carbid bodies will always be exposed to the action of the water which is discharged from the nozzle-section $g'$ of the passage $g$. This renders the generating action certain and positive as well as quick and sensitive.

The importance of the double or two-way closing action of the valve $g^5$ will now be noted. Suppose, for example, that the carbid in the holder $d\ d'$ has been entirely used up, so that the generation of gas is stopped thereby. Now when the gas is drawn by use from the storage-compartment $z$ the tank-section $b$ will of course be lowered, and the valve $g^5$ will thereby be forced downward out of engagement with the valve-seat section $g^2$, which will of course open the passage $g$ and permit water to flow therethrough into the generating-chamber $z$; but as there is presumably no carbid in the holder $d\ d'$ no gas will be generated, and hence the tank-section $b$ will remain in its lowermost position. This would of course permit the continued flow of water from the chamber $z$ into the generating-chamber $z'$ were it not for the fact that the valve $g^5$ in its lowermost position is forced into contact with the valve-seat section $g^3$, as already described.

It will be understood, of course, that if by any reason the water in the tank $a$ should lower to such an extent that the float $p^8$ should be permitted to turn the arm $p^7$ and valve $p^8$ into an extreme lower position, so that the passages $p^5$ and $p^6$ are thereby closed, the said parts could be restored to their operative positions either by pouring water into the top of the tank or by otherwise raising the said float and lever.

It will be understood, of course, that while I have, in connection with the preferred form of my improved apparatus, used specific terms to describe certain parts thereof I do not, however, intend to limit the scope of my claims thereto, except where positively set forth. It will also be understood that various alterations in the details of construction of the above apparatus may be made without departing from the spirit of my invention. It should also be understood that while I have used the term "rotary holder" for the carbid and means for imparting rotary motion to the carbid-holder in the specification and in certain of the claims, still, so far as the broad principles of my invention are concerned, it is not necessary that this rotary holder be given complete rotations; but, on the contrary, the above expressions are used in a sense broad enough to cover a holder that is mounted for partial rotations or vibrations.

What I claim, and desire to secure by Letters Patent of the United States, is as follows:

1. In a gas-generator, the combination with the generating-chamber, of a liquid-conveying passage leading thereto, a valve and a pair of valve-seats in said passage, said valve adapted to open the same, when in its intermediate position, and to close the same, when moved in either direction against one of the seats, and an automatic controller for said valve, operative to open and close the same, according to the pressure of the generated gas.

2. A gas generator and holder, comprising two compartments in communication with each other through a fluid-passage, a ball-valve and double valve-seat adapted to open said passage, when in an intermediate position and to close the same, when moved in either direction, and an automatic controller for said valve operative to open and close the same under the pressure of the generated gas.

3. A gas generator and holder, comprising two compartments in communication with each other through a fluid-passage, a valve in said passage adapted to open and close the same, a submerged float connected to and tending to hold said valve in one position, and a part, movable by the pressure of the varying volume of generated gas, adapted to move said valve into its other position, against the action of said float.

4. The combination with the two-part expansible holder, of the generating-chamber in communication with said holder through a fluid-passage that is formed with a double valve-seat, a ball-valve adapted, in its intermediate position, to be disengaged from said valve-seat to open said passage, but engageable with said valve-seat by movement in either direction, to close said passage, and a submerged air-bulb connected to said ball-valve and subject to the action of the movable part of said expansible holder, substantially as described.

5. In a gas apparatus, the combination with a generating-chamber, of a rotary holder adapted to hold and carry the solid gas-producer located in said generating-chamber, a device comprising a ball-valve operated by the pressure of the generated gas for controlling the flow of the liquid gas-producer onto the solid gas-producer, and automatic mechanism for moving said rotary holder, substantially as described.

6. In a gas generator and holder, the combination with the two-part expansible gas-holder and the generating-chamber, with suitable communicating passages between the same, of a rotary carbid-holder in said generating-chamber, a shaft engaging said rotary holder within said generating-chamber and provided with a ratchet-wheel, at a point exterior of said generating-chamber, and a gravity-held ratchet-bar pivoted at its forward end to a part movable with the movable section of said expansible gas-holder, and provided at its free lower end with ratchet-teeth which coöperate with said ratchet-wheel, substantially as described.

7. A gas apparatus comprising two compartments in communication with each other through a fluid-passage, a valve adapted to open and close said passage, a float with connections to said valve adapted to hold the same in one of its positions, and a part moved by the pressure of the varying volume of generated gas, adapted to move said valve into its other position against the action of said float.

In testimony whereof I affix my signature in presence of two witnesses.

WILBRA W. SWETT.

Witnesses:
JAS. F. WILLIAMSON,
F. D. MERCHANT.